US009603067B2

(12) United States Patent
Yang et al.

(10) Patent No.: US 9,603,067 B2
(45) Date of Patent: Mar. 21, 2017

(54) SENDING AND ACQUIRING METHOD, SYSTEM AND APPARATUS FOR REESTABLISHMENT PREPARATION MESSAGE

(75) Inventors: Yi Yang, Beijing (CN); Bin Jiao, Beijing (CN); Wei Bao, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 69 days.

(21) Appl. No.: 13/977,633

(22) PCT Filed: Dec. 15, 2011

(86) PCT No.: PCT/CN2011/084046
§ 371 (c)(1),
(2), (4) Date: Jun. 28, 2013

(87) PCT Pub. No.: WO2012/089033
PCT Pub. Date: Jul. 5, 2012

(65) Prior Publication Data
US 2013/0279477 A1 Oct. 24, 2013

(30) Foreign Application Priority Data
Dec. 31, 2010 (CN) .......................... 2010 1 0619657

(51) Int. Cl.
*H04W 36/00* (2009.01)
*H04W 76/04* (2009.01)
*H04W 84/04* (2009.01)

(52) U.S. Cl.
CPC ..... *H04W 36/0072* (2013.01); *H04W 76/046* (2013.01); *H04W 84/047* (2013.01)

(58) Field of Classification Search
CPC ........... H04W 36/0072; H04W 76/046; H04W 84/047
(Continued)

(56) References Cited

U.S. PATENT DOCUMENTS

2007/0149196 A1* 6/2007 Choi et al. .................... 455/436
2008/0254782 A1 10/2008 Nakamata et al.
(Continued)

FOREIGN PATENT DOCUMENTS

CN 101374324 A 2/2009
CN 101505514 A 8/2009
(Continued)

OTHER PUBLICATIONS

PCT International Search Report for PCT Counterpart Application No. PCT/CN2011/084046 with full English translation, 6 pgs. (Mar. 22, 2012).
(Continued)

*Primary Examiner* — Redentor Pasia
*Assistant Examiner* — Peter Mak
(74) *Attorney, Agent, or Firm* — Blakely, Sokoloff, Taylor & Zafman LLP

(57) ABSTRACT

Disclosed are a sending and acquiring method, system and apparatus for a radio resource control (RRC) reestablishment preparation message, relating to the technical field of communication and used for improving cell reestablishment success rate for terminals. In the present invention, when a relay node (RN) prepares a RRC reestablishment preparation message, besides preparing the RRC reestablishment preparation message for a target cell, the RN also prepares a RRC reestablishment preparation message for a donor evolved Node B (DeNB) belonging to the RN and/or cells of other RNs managed by the DeNB, and sends the prepared RRC reestablishment preparation message to the DeNB over a handover request message. After receiving the handover request message, the DeNB needs to parse the handover preparation information in the handover request message, and store the obtained RRC reestablishment preparation message of the cell managed by the DeNB. Employing the
(Continued)

technical scheme can greatly improve the reestablishment success rate between the terminal and the cell managed by the DeNB.

2 Claims, 9 Drawing Sheets

(58) Field of Classification Search
USPC .......................................... 370/315, 328–331
See application file for complete search history.

(56) References Cited

U.S. PATENT DOCUMENTS

| | | | |
|---|---|---|---|
| 2010/0210268 A1* | 8/2010 | Lim ...................... | H04W 36/04 455/436 |
| 2011/0002304 A1* | 1/2011 | Lee ...................... | H04W 36/02 370/331 |
| 2011/0070897 A1* | 3/2011 | Tang et al. ................. | 455/456.1 |
| 2011/0080890 A1* | 4/2011 | Cai ................... | H04W 36/0033 370/331 |
| 2011/0080891 A1* | 4/2011 | Cai ................... | H04W 36/0033 370/331 |
| 2011/0177816 A1* | 7/2011 | Hole ................ | H04W 36/0072 455/436 |
| 2011/0261747 A1* | 10/2011 | Wang et al. .................. | 370/315 |
| 2011/0275374 A1* | 11/2011 | Narasimha et al. .......... | 455/436 |

FOREIGN PATENT DOCUMENTS

| | | |
|---|---|---|
| CN | 101646212 A | 2/2010 |
| CN | 102104906 A | 6/2011 |
| EP | 2661120 A1 | 11/2013 |

OTHER PUBLICATIONS

Written Opinion of the International Search Authority for PCT Counterpart Application No. PCT/CN2011/084046 with full English translation, 10 pgs. (Mar. 22, 2012).

PCT Notification Concerning Transmittal of International Preliminary Report on Patentability (Chapter I of the Patent Cooperation Treaty) for PCT Counterpart Application No. PCT/CN2011/084046, 14 pp. (including English translation), (Jul. 11, 2013).

\* cited by examiner

SENDING AND ACQUIRING METHOD, SYSTEM AND APPARATUS FOR REESTABLISHMENT PREPARATION MESSAGE

CROSS-REFERENCE TO RELATED APPLICATIONS

This patent application is a U.S. National Stage under 35 U.S.C. §371 of International Application No. PCT/CN2011/084046, filed on Dec. 15, 2011, entitled SENDING AND ACQUIRING METHOD, SYSTEM AND APPARATUS FOR REESTABLISHMENT PREPARATION MESSAGE, designating the United States, and claiming the benefit of Chinese Patent Application No. 201010619657.8, filed with the Chinese Patent Office on Dec. 31, 2010 and entitled "Method, system and apparatus for sending and acquiring reestablishment information", which was incorporated by reference in its entirety.

FIELD OF THE INVENTION

The present invention relates to the technical field of wireless communications and particularly to a method, system and apparatus for sending and acquiring reestablishment information.

BACKGROUND OF THE INVENTION

In a future mobile communication system, e.g., a Beyond Third Generation (B3G) system or a Long Term Evolution-Advanced (LTE-A) system, higher peak data rates and cell throughput will be offered and also a larger bandwidth will be required, but at present there are few unallocated bandwidths below 2 GHz, so a part or all of the bandwidth required for the B3G System has to be sought in a higher frequency band, e.g., above 3 GHz. The higher the frequency band is, the faster an electric wave will be attenuated, and the shorter distance it will travel over so a larger number of Evolved NodeBs (eNBs) are required to ensure seamless coverage in the same area, which will undoubtedly increase network deployment cost due to the typically expensive eNBs. In order to address the issues of network deployment cost and coverage, various manufactures and standardization organizations come to research the introduction of a Relay Node (RN) to a cellular system for coverage improvement.

FIG. 1 is a network architecture of the LTE-A system with an RN deployed, where the RN is wirelessly connected with a Donor Evolved Node B (DeNB) which functions as a proxy. The RN accesses to core network via a donor cell managed by the DeNB without a direct wired interface with the core network, and each RN can control one or more cells. In this architecture, an interface between a User Equipment (UE) and the RN is referred to as a Uu interface, and an interface between the RN and the DeNB is referred to as a Un interface.

An X2 handover is divided into three phases comprising handover preparation, handover execution and path switch (i.e., handover completion) as illustrated in FIG. 2. The handover preparation phase is initiated by a source eNB which select a target eNB. A handover request acknowledgement message carries a handover command message generated by the target eNB and is forwarded to the UE by the source eNB, as illustrated in FIG. 3.

In a relay scenario, the DeNB reads an identifier of a target cell in a handover request message and forwards the handover request message to the corresponding target eNB after receiving the handover request message.

In a handover procedure, after selecting the target cell, in order to increase the success rate of the UE reestablishment to another cell, the source eNB can further prepare Radio Resource Control (RRC) reestablishment information of other cells served by the target eNB besides the target cell and include the prepared RRC reestablishment information in an RRC context Information Element (IE) in the handover request for an X2 handover or in a Source To Target Container IE of the handover required message for an S1 handover.

In order to increase the handover success rate, when the source eNB prepares the RRC reestablishment information of the target cell, it can prepare reestablishment information of cells served by multiple target eNBs in parallel, and generate multiple handover request messages and send the multiple handover request messages to the corresponding target eNBs. Thus if the UE fails to handover to one of the eNBs, then when it tries to reestablish to another eNB, the reestablishment procedure is very likely to succeed if this eNB has previously received a handover request. Multiple handovers in parallel can increase the handover success rate of the UE when there are more overlapping coverage areas among several eNBs.

The RRC reestablishment information of a cell generally includes a key and an integrity check code associated with the cell. When the UE selects a specific cell to perform RRC reestablishment, it will report an integrity check code corresponding to the cell, and a target eNB compares the integrity check code reported by the UE with its own stored integrity check code and can allow an access of the UE to the cell if the integrity check codes are consistent.

In the prior art, the source eNB need not prepare reestablishment information of its own cell but will calculate an integrity check code and verify the UE only if the UE perform RRC reestablishment to its own cells.

The inventors have found during making of the invention the following technical problems in the prior art:

In the relay scenario, for a handover of the UE from the RN to the target eNB, if the handover of the UE fails, then the UE is very likely to select a cell of the DeNB serving the RN to perform reestablishment and even possibly select a cell of another RN served by the DeNB to perform reestablishment, but the DeNB has no RRC reestablishment information of the DeNB cells and the other RN served by the DeNB has no RRC reestablishment information of its own cells, so the reestablishment may fail when the UE selects one of these cells to perform reestablishment.

Similarly, for a handover of the UE from the source eNB to the RN, when the handover fails, if the UE selects a cell of the DeNB serving the RN or a cell of another RN served by the DeNB to perform reestablishment, and the DeNB has no RRC reestablishment information of the cell managed by itself and the other RN served by the DeNB has no RRC reestablishment information of the cell managed by itself, then the cell reestablishment may fail.

SUMMARY OF THE INVENTION

Embodiments of the invention provides a method and apparatus for sending RRC reestablishment information so as to address the problem in the prior art of the impossibility for an RN to report RRC reestablishment information of a cell managed by a DeNB and/or by another RN served by the same DeNB.

Embodiments of the invention provide a method, system and apparatus for acquiring RRC reestablishment information so as to increase the reestablishment success rate to a cell.

A method for acquiring RRC reestablishment information includes:

receiving, by a DeNB, a handover request message;

parsing, by the DeNB, handover preparation information in the handover request message to obtain RRC reestablishment information of one or more cells; and selecting, by the DeNB, RRC reestablishment information of a cell managed by the DeNB from the obtained RRC reestablishment information and storing the selected RRC reestablishment information.

An apparatus for acquiring RRC reestablishment information includes:

a handover request receiving unit configured to receive a handover request message;

a reestablishment information parsing unit configured to parse handover preparation information in the handover request message to obtain RRC reestablishment information of one or more cells; and a reestablishment information storing unit configured to select RRC reestablishment information of a cell managed by its own from the obtained RRC reestablishment information and to store the selected RRC reestablishment information.

A method for sending RRC reestablishment information includes:

receiving, by an RN, a cell measurement report reported from a UE;

determining, by the RN, a cell with an eNB identifier of the RN according to the received cell measurement report and preparing RRC reestablishment information of the cell; and sending, by the RN, a handover request message carrying the prepared RRC reestablishment information to a DeNB serving the RN.

An apparatus for sending RRC reestablishment information includes:

a measurement result receiving unit configured to receive a cell measurement report reported from a UE;

a reestablishment information preparing unit configured to determine a cell with an eNB identifier of a current RN according to the received cell measurement report and to prepare RRC reestablishment information of the cell; and a handover request sending unit configured to send a handover request message carrying the prepared RRC reestablishment information to a DeNB.

In this solution, the RN receives the cell measurement report reported from the UE and then determines a cell with the same eNB identifier of the RN according to the received cell measurement report and acquires the RRC reestablishment information of the cell, and then sends the handover request message carrying the prepared RRC reestablishment information to the DeNB. The cell with the same eNB identifier of the RN is a cell managed by the DeNB serving the RN and/or by another RN served by the DeNB, so with this solution, the RN can send RRC reestablishment information of the cell managed by the DeNB and/or by the other RN served by the DeNB to the DeNB.

A wireless communications system includes:

a source eNB configured to send a handover request message to a target DeNB; and the target DeNB configured to receive the handover request message, to parse handover preparation information in the handover request message to obtain RRC reestablishment information of one or more cells, to select RRC reestablishment information of a cell managed by the DeNB from the obtained RRC reestablishment information, and to store the selected RRC reestablishment information.

A wireless communications system includes:

a source RN configured to receive a cell measurement report reported from a UE, to determine a cell with the same eNB identifier of the RN according to the received cell measurement report, to prepare RRC reestablishment information of the cell and to send a handover request message carrying the prepared RRC reestablishment information to a DeNB serving the RN; and the DeNB configured to receive the handover request message, to parse handover preparation information in the handover request message to obtain RRC reestablishment information of one or more cells, to select RRC reestablishment information of a cell managed by the DeNB from the obtained RRC reestablishment information, and to store the selected RRC reestablishment information.

In the invention the DeNB need parse the handover preparation information in the handover request message after receiving the handover request message and store the obtained RRC reestablishment information of the cell managed by the DeNB. Thus, if a UE is reestablished to the cell managed by the DeNB upon handover failure, then the reestablishment success rate to the cell managed by the DeNB can be greatly increased because the DeNB has the RRC reestablishment information of the cell managed by itself.

DETAILED DESCRIPTION OF THE EMBODIMENTS

In order to increase the success rate of reestablishment of a UE to a cell, embodiments of the invention provide a method for sending RRC reestablishment information and a method for acquiring RRC reestablishment information, and in the methods, when an RN prepares RRC reestablishment information, it prepares RRC reestablishment information of a cell managed by the DeNB serving the RN and/or by another RN managed by the same DeNB in addition to RRC reestablishment information of the target cell and sends the prepared RRC reestablishment information to the DeNB over a handover request message. The DeNB need parse handover preparation information in the handover request message and store the obtained RRC reestablishment information of the cell managed by itself.

Figure 4:
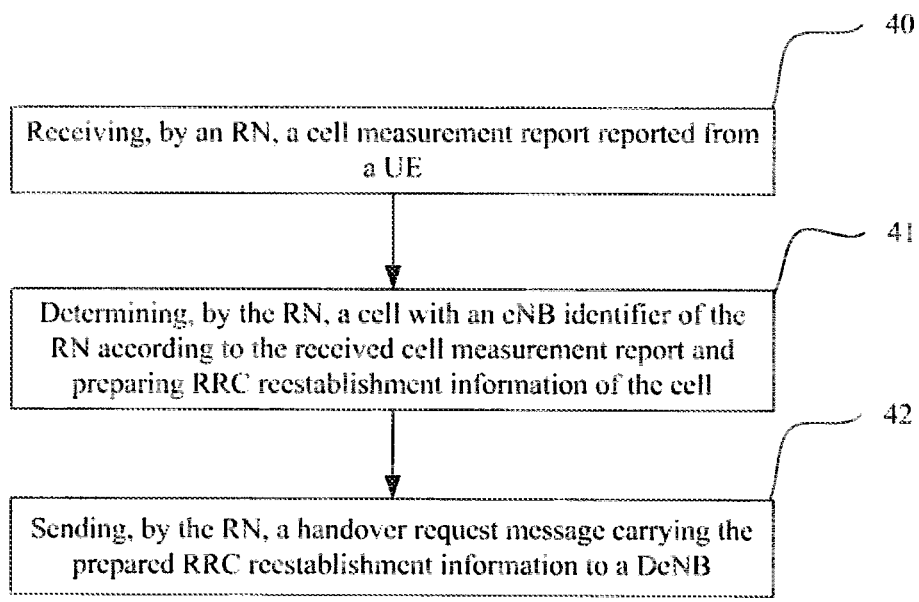
FIG. 4 is a schematic flow diagram of a method according to an embodiment of the invention.

Referring to FIG. 4, a method for sending RRC reestablishment information according to an embodiment of the invention particularly includes the following steps:

Step 40: receiving, by an RN, a cell measurement report reported from a UE;

Step 41: determining, by the RN, a cell with the same eNB identifier of the RN according to the received cell measurement report and preparing RRC reestablishment information of the cell; and Step 42: sending, by the RN, a handover request message carrying the prepared RRC reestablishment information to the DeNB serving the RN.

In the step 41, the RN determines the cell with the same eNB identifier of the RN according to the received cell measurement report particularly as follows:

For each cell measurement result in the cell measurement report, the RN determines whether first 20 bits of a cell identifier in the cell measurement result is the same as the eNB identifier of the RN and determines a cell corresponding to the cell identifier as the cell with the same eNB identifier of the RN when the determination is positive.

Correspondingly, when a target RN receives the handover request message carrying a target cell identifier and RRC reestablishment information, it will not consider it as an abnormal condition, and the target RN stores the RRC reestablishment information and replies a handover request acknowledgment message to the node sending the handover request message, where the target cell identifier is an identifier of a cell which is not managed by the RN, and the RRC reestablishment information is RRC reestablishment information of the cell managed by the RN.

Figure 5:
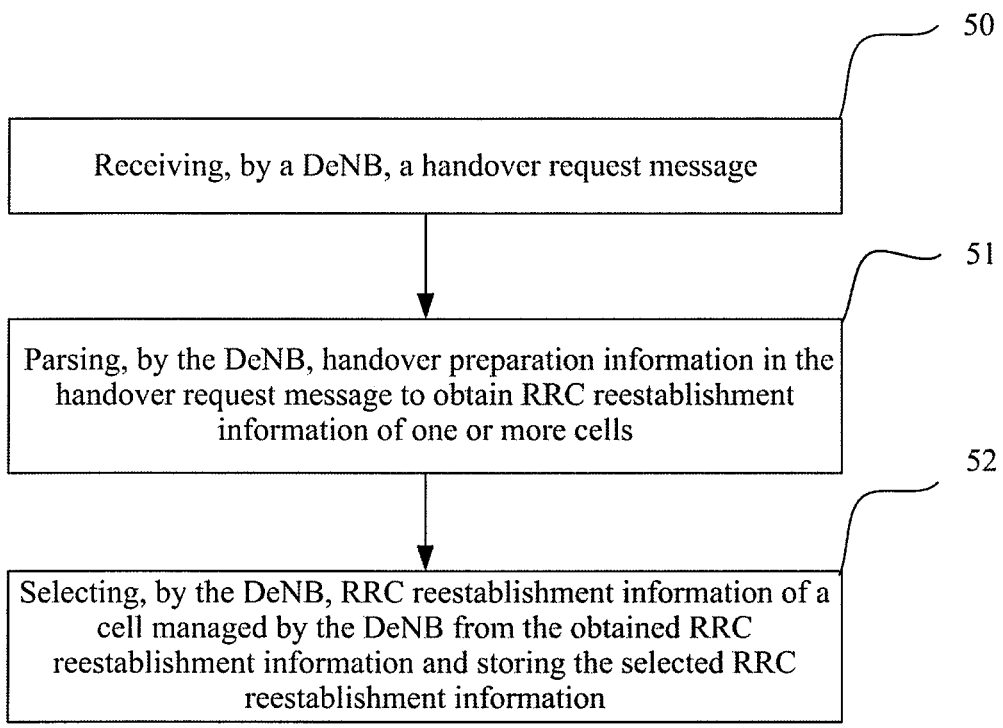
FIG. 5 is a schematic flow diagram of another method according to an embodiment of the invention.

Referring to FIG. 5, a method for acquiring RRC reestablishment information according to an embodiment of the invention particularly includes the following steps:

Step 50: receiving, by a DeNB, a handover request message;

Step 51: parsing, by the DeNB, handover preparation information in the handover request message to obtain RRC reestablishment information of one or more cells; and Step 52: selecting, by the DeNB, RRC reestablishment information of a cell managed by the DeNB from the obtained RRC reestablishment information and storing the selected RRC reestablishment information.

Preferably, after obtaining the RRC reestablishment information of the one or more cells, the DeNB can determine whether the obtained RRC reestablishment information includes RRC reestablishment information of a cell managed by an RN served by the DeNB and send the handover request message to the RN when the determination is positive. Preferably, before the DeNB sends the handover request message to the RN, the DeNB can modify the target cell identifier in the handover request message to an identifier of a cell managed by the corresponding RN, and of course this modification can be skipped.

Furthermore, after the DeNB receives the handover request message, if the DeNB itself is not a target node, then it forwards the handover request message to the target node which is a node managing a cell corresponding to the target cell identifier carried in the handover request message.

Preferably, before the DeNB sends the handover request message to the RN and/or the target node, the DeNB can delete from the handover request message information of a cell unrelated to the node receiving the handover request message to thereby save signaling overhead. The information of the cell includes RRC reestablishment information.

In this method, the DeNB returns a handover request acknowledgement message to a source node particularly in the following three schemes:

In a first scheme, if the DeNB is the target node which is the node managing the cell corresponding to the target cell identifier included in the handover request message, then the DeNB performs access control according to the handover request message and sends the handover request acknowledgement to the source node sending the handover request message. If RRC reestablishment information carried in the handover request message received by the DeNB includes RRC reestablishment information of a cell which is not managed by the DeNB, then it will not be considered as an abnormal condition, and the RRC reestablishment information of that cell can be ignored.

The source node here is a source eNB or a source RN.

In a second scheme, if the target node is an RN served by the DeNB, then the DeNB forwards a handover request acknowledgement message sent from the target node to the source node sending the handover request message after receiving the handover request acknowledgement message; or The DeNB selects one handover request acknowledgement message from received handover request acknowledgement messages sent from all or a part of specific RNs after receiving the handover request acknowledgement messages and forwards the selected handover request acknowledgement message to the source node sending the handover request message, where the specific RNs are RNs to which the DeNB sends the handover request message; or The DeNB forwards all the received handover request acknowledgement messages to the source node sending the handover request message.

The source node here is a source eNB or a source RN.

In a third scheme, if the target node is another eNB, then the DeNB forwards a handover request acknowledgement message sent from the target node to the source node sending the handover request message after receiving the handover request acknowledgement message; or The DeNB selects one handover request acknowledgement message from received handover request acknowledgement messages sent from the target node and all or a part of specific RNs after receiving the handover request acknowledgement messages and forwards the selected handover request acknowledgement message to the source node sending the handover request message, where the specific RNs are RNs to which the DeNB sends the handover request message; or The DeNB forwards all the received handover request acknowledgement messages to the source node sending the handover request message.

The source node here is a source RN.

After the other eNB receives the handover request message and when RRC reestablishment information carried in the handover request message includes RRC reestablishment information of a cell which is not managed by the other eNB, the other eNB will not consider it as an abnormal condition, and can ignore the RRC reestablishment information of that cell and return a handover request acknowledgement message to the DeNB.

In the second or third scheme, the DeNB can select one handover request acknowledgement message from the received handover request acknowledgement messages in such a selection method that the DeNB selects a handover request acknowledgement message with the largest number of accepted Evolved Universal Terrestrial Radio Access Network Radio Access Bearers (E-RABs) or a handover request acknowledgement message returned from the most lightly loaded RN among all the received handover request acknowledgement messages.

Preferably, after the DeNB returns the handover request acknowledgement message to the source node, the DeNB will receive uplink data and/or downlink data of a UE forwarded by the source node and store the unlink data and/or the downlink data.

Furthermore, if the DeNB forwards only one handover request acknowledgement message to the source node, then the DeNB can further forward the uplink data and/or the downlink data forwarded by the source node to the node returning the handover request acknowledgement message. If the DeNB forwards all the received handover request acknowledgement messages to the source node, then the DeNB can forward the uplink data and/or the downlink data forwarded by the source node to all the nodes returning the handover request acknowledgement messages.

The invention will be detailed below.

A main idea of the invention lies in that when a source RN prepares reestablishment information, it prepares reestablishment information for cells of a DeNB and of another RN managed by the DeNB in addition to a cell of a target eNB. When the DeNB forwards a handover request, the DeNB parses and stores the reestablishment information of its own cell at least and sends the handover request to the RN to which the reestablishment information relates.

The source RN can distinguish between a cell managed by the DeNB and that managed by the other RNs according to first 20 bits of a cell identifier measured and reported by a UE.

Embodiments of the invention are as follows:

First Embodiment

X2 Handover

Figure 6A:
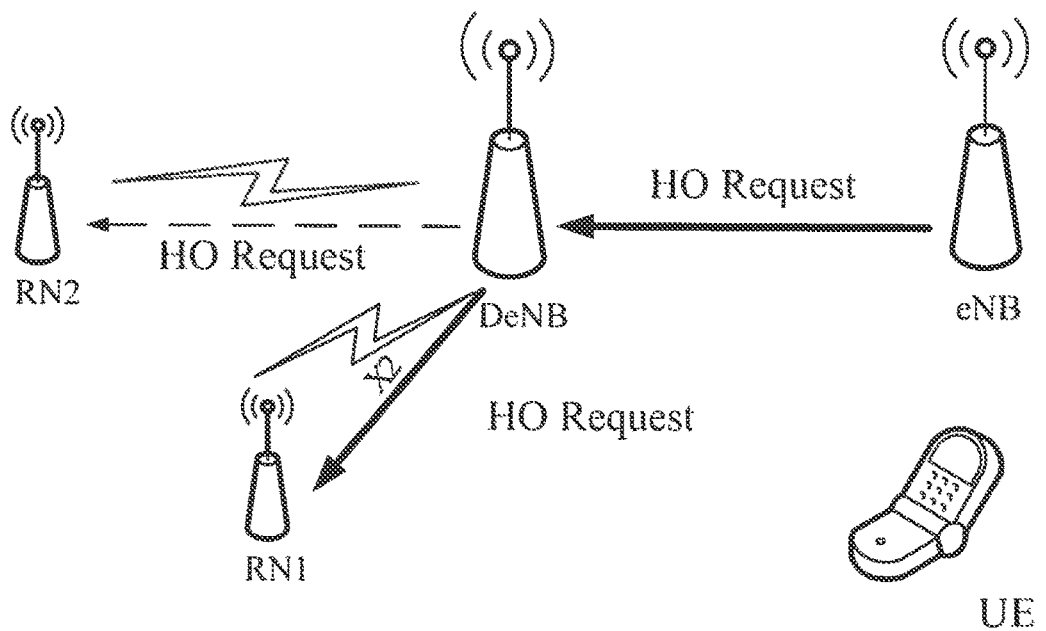
FIG. 6A is a schematic diagram of a handover according to a first embodiment of the invention.

As illustrated in FIG. 6A:

Step 1: a source eNB sends a handover request message carrying RRC reestablishment information of cells to a target DeNB. Since the source eNB can not distinguish between an RN cell and a DeNB cell, it may prepare RRC reestablishment information of some cells served by the DeNB and/or cells of some RNs served by the DeNB when preparing the RRC reestablishment information.

Step 2: the target DeNB sends the handover request message to a target RN, e.g., RN1 as illustrated, according to a target cell identifier in the handover request message after receiving the handover request message.

The target DeNB further performs the following operations (which will be also applicable when the target cell is a cell of the DeNB):

The target DeNB parses at least handover preparation information (e.g., an RRC Context IE) in the handover request message after receiving the handover request message and stores at least RRC reestablishment information of a cell managed by the target DeNB if there is the RRC reestablishment information of the cell managed by the target DeNB.

Optionally, if the source eNB also prepares RRC reestablishment information of a cell of another RN, then the target DeNB also forwards the handover request message to the related RN, e.g. RN2 as illustrated.

When the target DeNB forwards the handover request message to the other node, the target DeNB can delete information of a cell unrelated to the other node from the handover request message as signaling optimization, for example, the target DeNB can delete the RRC reestablishment information of the cell of the target DeNB and the cell of RN2 from the handover request message sent to the target RN1.

When the DeNB forwards the handover request message to RN2, the DeNB can not change the target cell identifier in the handover request message, that is, maintain the target cell in the handover request message as a specific cell of RN1; or the DeNB can change the target cell identifier in the handover request message, that is, modify the target cell identifier in the handover request message to an identifier of a specific cell of RN2.

Step 3: if the target cell in the handover request message received by the RN is not a cell managed by the RN but the RRC reestablishment information includes information of its own cell; or if the target cell in the handover request message received by the RN is a cell managed by the RN but the RRC reestablishment information includes information of another cell than its own cell, then the RN will not consider it as an abnormal condition, and can ignore the RRC reestablishment information of that cell and return a handover request acknowledgement message to the DeNB.

Step 4: the target DeNB can: (a) forward to the source eNB the handover request acknowledgement message returned from the target RN1 after receiving the handover request acknowledgement message; or (b) decide which one of the handover request acknowledgement messages returned from a part of all of the RNs to be forwarded to the source eNB after receiving the handover request acknowledgement messages, where a decision criterion can be that the target DeNB determines which one of the RNs accepts the largest number of E-RABs according to these handover request acknowledgement messages or determines the most lightly loaded RN according to information exchanged via an X2 interface, and thus forwards to the source eNB the handover request acknowledgement message returned from the determined RN; or (c) send the received handover request acknowledgement messages to the source eNB serially.

If the target DeNB forwards only one handover request acknowledgement message to the source eNB, then the target DeNB further forwards downlink data and/or uplink data forwarded by the source eNB to the node returning the handover request acknowledgement message. If the target DeNB forwards all the received handover request acknowledgement messages to the source eNB, then the target DeNB forwards downlink data and/or uplink data forwarded by the source eNB to all the RNs returning the handover request acknowledgement messages.

For all the foregoing scenarios (a), (b) and (c), the DeNB stores the downlink data and/or the uplink data forwarded by the source eNB. Thus the loss of user data can be alleviated when a UE performs reestablishment to the cell of the DeNB upon a handover failure.

Step 5: if the source eNB receives one handover request acknowledgement message, then it sends a handover command therein to the UE. If the UE tries to perform reestablishment to RN2 or DeNB upon a handover failure to the target RN1, then RN2 or DeNB initiates a path switch procedure to a core network upon successful reestablishment.

If the source eNB receives multiple handover request acknowledgement messages, then the source eNB decides a handover command in which one of the handover request acknowledgement messages to be sent to the UE. The target eNB initiates a path switch procedure to the core network upon successful handover of the UE.

Second Embodiment

Figure 6B:
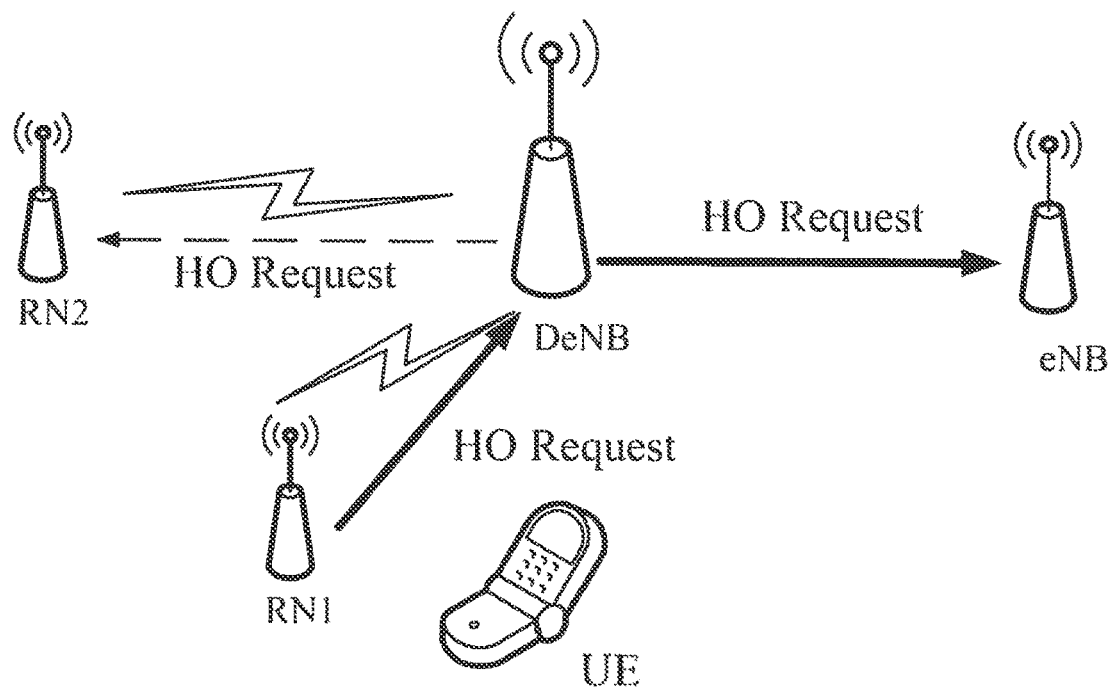
FIG. 6B is a schematic diagram of a handover according to a second embodiment of the invention.

As Illustrated in FIG. 6B

Step 1: a source RN1 prepares RRC reestablishment information of a cell with the same eNB ID of the RN in addition to RRC reestablishment information of a cell of a target eNB when preparing RRC reestablishment information, and sends a handover request message carrying the prepared RRC reestablishment information to a DeNB serving the RN.

The source RN1 prepares the RRC reestablishment information of such a cell with the same eNB ID of the RN that can be determined by a measurement report reported from a LIE.

Step 2: the DeNB sends the handover request message to the target eNB (the eNB here can also be an RN served by the DeNB) according to a target cell identifier in the handover request message sent from the RN after receiving the handover request message.

The DeNB further performs the following operations (which will be also applicable when the target cell is a cell of the DeNB or a cell of another RN served by the DeNB):

The DeNB parses at least handover preparation information (e.g., an RRC Context IE) in the handover request message sent from the RN after receiving the handover request message and stores at least RRC reestablishment information of a cell managed by the DeNB if there is the RRC reestablishment information of the cell managed by the DeNB. If there is RRC reestablishment information of a cell of another RN, then the DeNB forwards the handover request message to the related RN, e.g., RN2 as illustrated.

When the DeNB forwards the handover request message to the other node, the DeNB can delete information of a cell unrelated to the other node from the handover request message as signaling optimization. For example, the DeNB can delete the RRC reestablishment information of the cell of the DeNB and the cell of RN2 from the handover request message sent to the target eNB.

When the DeNB forwards the handover request message to RN2, the DeNB can not change the target cell identifier in the handover request message, that is, maintain the target cell in the handover request message as a specific cell of the target eNB; or the DeNB can change the target cell identifier in the handover request message, that is, modify the target cell identifier in the handover request message to an identifier of a specific cell of RN2.

Step 3: if the target cell in the handover request message received by RN2 is not a cell managed by RN2 but the RRC reestablishment information includes information of its own cell, then RN2 will not consider it as an abnormal condition, and return a handover request acknowledgement message to the DeNB.

Step 4: if the RRC reestablishment information in the handover request message received by the target eNB includes information of another cell than its own cell, then the target eNB will not consider it as an abnormal condition, and can ignore the RRC reestablishment information of that cell and return a handover request acknowledgement message to the DeNB.

The foregoing steps 3 and 4 may not be performed temporally in a strict sequential order.

Step 5: the DeNB can: (a) forward to the source RN1 the handover request acknowledgement message returned from the target eNB after receiving the handover request acknowledgement message; or (b) decide which one of the handover request acknowledgement messages returned from the target eNB and a part or all of the RNs to be forwarded to the source RN1 after receiving the handover request acknowledgement messages, where a decision criterion can be the same as that in the step 4 of the first embodiment; or (c) send the received handover request acknowledgement messages to the source RN1 serially.

If the DeNB forwards only one handover request acknowledgement message to the source RN1, that is, in the foregoing scenarios (a) and (b), then it is a multi-cell preparation scenario. The DeNB forwards downlink data and/or uplink data forwarded by the source RN1 to the node returning the handover request acknowledgement message. If the DeNB forwards all the received handover request acknowledgement messages to the source RN1, then the DeNB forwards downlink data and/or uplink data forwarded by the source RN1 to all the nodes (e.g., RN2 and the target eNB) returning the handover request acknowledgement messages.

For all the foregoing scenarios (a), (b) and (c), the DeNB stores the downlink data and/or the uplink data forwarded by the source RN1. Thus, the loss of user data can be alleviated when the UE is reestablished to the cell of the DeNB upon failure of a handover.

Step 6: if the source RN1 receives one handover request acknowledgement message, then it sends a handover command therein to the UE. If the UE tries to perform reestablishment to RN2 or DeNB upon a handover failure to the target eNB, then RN2 or DeNB initiates a path switch procedure to a core network upon successful reestablishment.

If the source RN1 receives multiple handover request acknowledgement messages, then the source RN1 decides a handover command in which one of the handover request acknowledgement messages to be sent to the UE. The target eNB initiates a path switch procedure to the core network upon successful handover of the UE.

Third Embodiment

S1 Handover

Figure 6C:
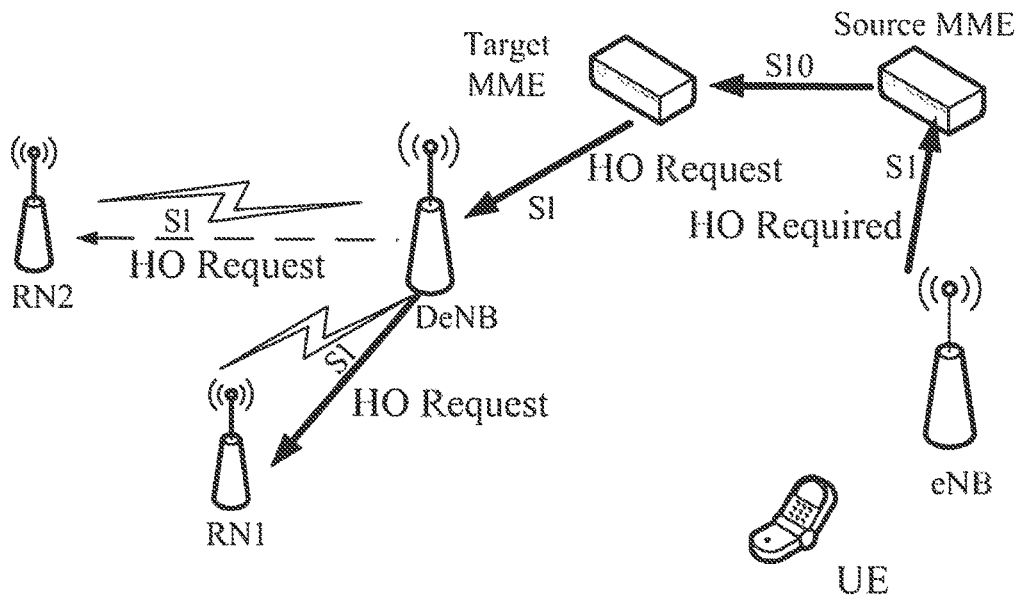
FIG. 6C is a schematic diagram of a handover according to a third embodiment of the invention.

As illustrated in FIG. 6C:

Step 1: a source eNB sends a handover request message carrying RRC reestablishment information of cells to a source MME. Since the source eNB can not distinguish between an RN cell and a DeNB cell, it may prepare RRC reestablishment information of some cells served by the DeNB and/or cells of some RNs served by the DeNB when preparing the RRC reestablishment information.

Step 2: the source MME determines a target MME and sends a forward relocation request message. The target MME determines a target DeNB and sends the handover request message thereto.

Step 3: the target DeNB sends the handover request message to a target RN, e.g., RN1 as illustrated, according to a target cell identifier in the handover request message sent from the target MME after receiving the handover request message.

The target DeNB further performs the following operations (which will be also applicable when the target cell is a cell of the DeNB):

The target DeNB parses at least handover preparation information (e.g., a Source to Target Container IE) in the handover request message after receiving the handover request message and stores at least RRC reestablishment information of a cell managed by the target DeNB if there is the RRC reestablishment information of the cell managed by the target DeNB. If the source eNB also prepares RRC reestablishment information of a cell of another RN, then the target DeNB also forwards the handover request message to the related RN, e.g., illustrated.

When the target DeNB forwards the handover request message to the other node, the target DeNB can delete information of a cell unrelated to the other node from the handover request message as signaling optimization, for example, the target DeNB can delete the RRC reestablishment information of the cell of the target DeNB and the cell of RN2 from the handover request message sent to the target RN1.

When the target DeNB forwards the handover request message to RN2, the target DeNB can not change the target cell identifier in the handover request message, that is, maintain the target cell in the handover request message as a specific cell of RN1; or the target DeNB can change the target cell identifier in the handover request message, that is, modify the target cell identifier in the handover request message to an identifier of a specific cell of RN2.

Step 4: if the target cell in the handover request message received by the RN is not a cell managed by the RN but the RRC reestablishment information includes information of its own cell; or if the target cell in the handover request message received by the RN is a cell managed by the RN but the RRC reestablishment information includes information of another cell than its own cell, then the RN will not consider it as an abnormal condition, and can ignore the RRC reestablishment information of that cell and return a handover request acknowledgement message to the DeNB (as in the step 3 of the first embodiment).

Step 5: the target DeNB can: (a) forward to the target MME the handover request acknowledgement message returned from the target RN1 after receiving the handover request acknowledgement message; or (b) decide which one of the handover request acknowledgement messages returned from a part of all of the RNs to be forwarded to the target MME after receiving the handover request acknowledgement messages, where a decision criterion can be the same as that in the step 4 of the first embodiment.

No matter whichever one of the handover request acknowledgement messages is forwarded by the DeNB, the DeNB stores downlink data and/or uplink data forwarded by the source eNB. Thus, the loss of user data can be alleviated when a UE performs RRC reestablishment to the cell of the DeNB upon a handover failure.

Step 6: if the source eNB receives a handover command message sent from the source MME, then it sends the handover command to the UE. Successful RRC reestablishment may be possible if the UE performs RRC reestablishment to RN2 or the DeNB upon a handover failure.

Fourth Embodiment

S1 Handover

Figure 6D:
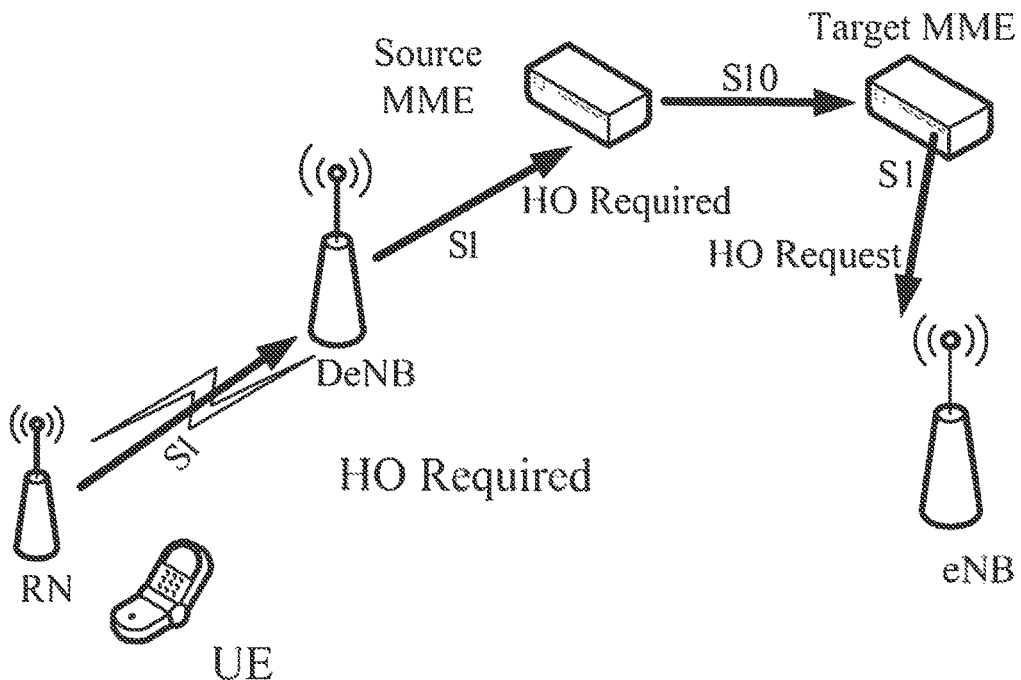
FIG. 6D is a schematic diagram of a handover according to a fourth embodiment of the invention.

As illustrated in FIG. 6D:

Step 1: a source RN prepares RRC reestablishment information of a cell with an eNB ID of the RN in addition to RRC reestablishment information of a cell of a target eNB when preparing RRC reestablishment information, and sends a handover request message carrying the prepared RRC reestablishment information to a DeNB serving the RN.

The source RN prepares the RRC reestablishment information of such a cell with the same eNB ID of the RN that can be determined by a measurement report reported from a UE.

Step 2: the DeNB sends to a target MME the handover request message sent from the RN after receiving the handover request message.

The DeNB parses at least handover preparation information (e.g., a Source to Target Container Information IE) in the handover request message sent from the RN after receiving the handover request message and stores at least RRC reestablishment information of a cell managed by the DeNB if there is the RRC reestablishment information of the cell managed by the target DeNB.

When the DeNB forwards the handover request message, the DeNB can delete information of a cell unrelated to the target node from the handover request message as signaling optimization. For example, the DeNB can delete the RRC reestablishment information of the DeNB cells and the cells of another RNs.

Step 3: the source MME locates a target MME and sends a forward relocation request message. The target MME determines a target eNB and sends the handover request message thereto. If the RRC reestablishment information in the handover request message received by the target eNB includes information of another cell than its own cell, then the target eNB will not consider it as an abnormal condition, and can ignore the RRC reestablishment information of that cell. The target eNB returns a handover request acknowledgement message to the target MME, the target MME returns a forward relocation response message to the source MME, the source MME sends a handover command message to the DeNB, and the DeNB forwards the handover command message to the RN.

Step 4: the RN sends the handover command message to the UE, and the UE is handed over to the target eNB. If the UE RRC reestablishment to the DeNB is successful upon handover failure, then the DeNB initiates a path switch procedure to a core network, which is similar to an X2 handover.

Figure 7A:
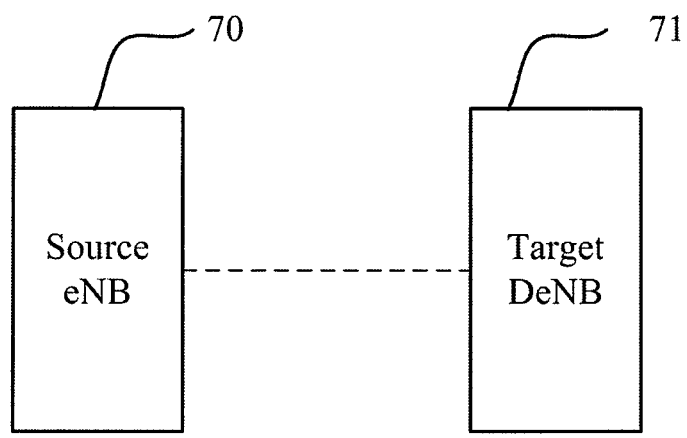
FIG. 7A is a schematic structural diagram of a system according to an embodiment of the invention.
Figure 7B:
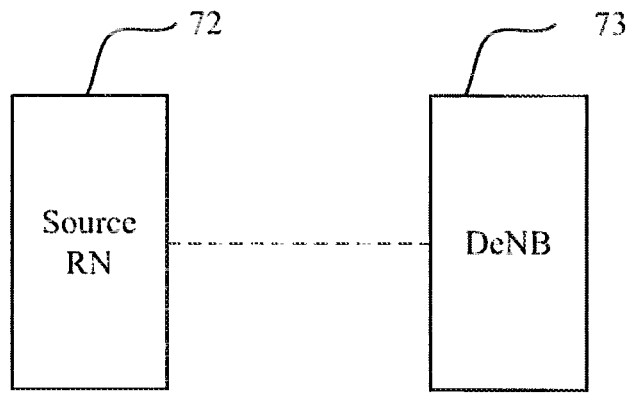
FIG. 7B is a schematic structural diagram of another system according to an embodiment of the invention.

Referring to FIG. 7A, an embodiment of the invention further provides a wireless communication system, which includes:

a source eNB 70 configured to send a handover request message to a target DeNB; and the target DeNB 71 configured to receive the handover request message, to parse handover preparation information in the handover request message to obtain RRC reestablishment information of one or more cells, to select RRC reestablishment information of a cell managed by the DeNB from the obtained RRC reestablishment information, and to store the selected RRC reestablishment information.

The target DeNB 71 is further configured:

to determine whether the obtained RRC reestablishment information of the one or more cells comprises RRC reestablishment information of a cell managed by an RN served by the DeNB after obtaining the RRC reestablishment information and to send the handover request message to the RN when the determination is positive.

The target DeNB 71 is further configured:

to store received uplink data and/or downlink data of a UE forwarded by the source eNB.

Figure 1:
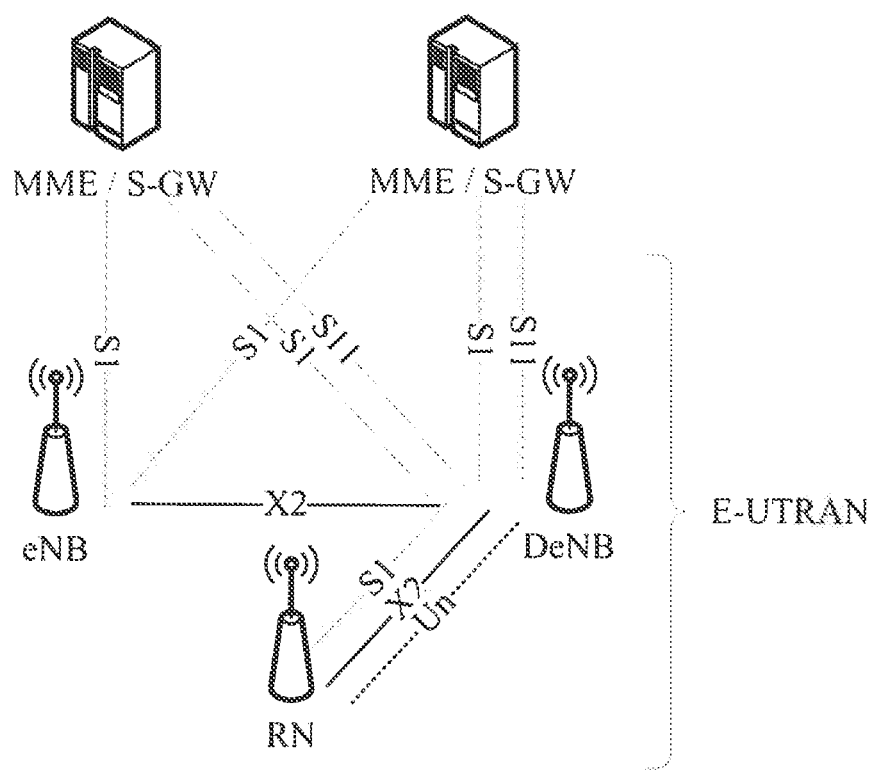
FIG. 1 is a schematic diagram of an E-UTRAN network architecture including an RN in the prior art.
Figure 2:
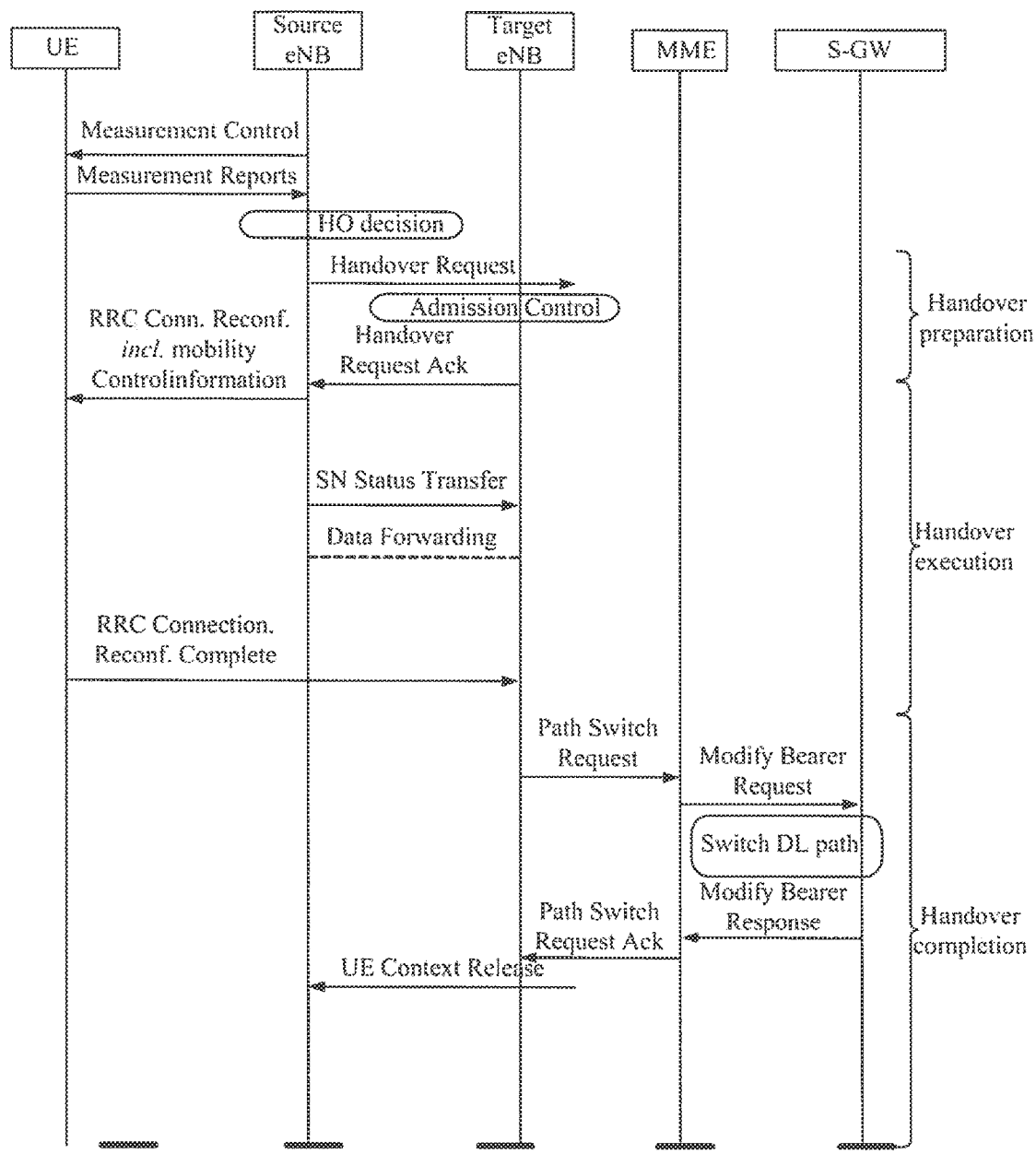
FIG. 2 is a schematic diagram of an X2 handover procedure in the prior art.
Figure 3:
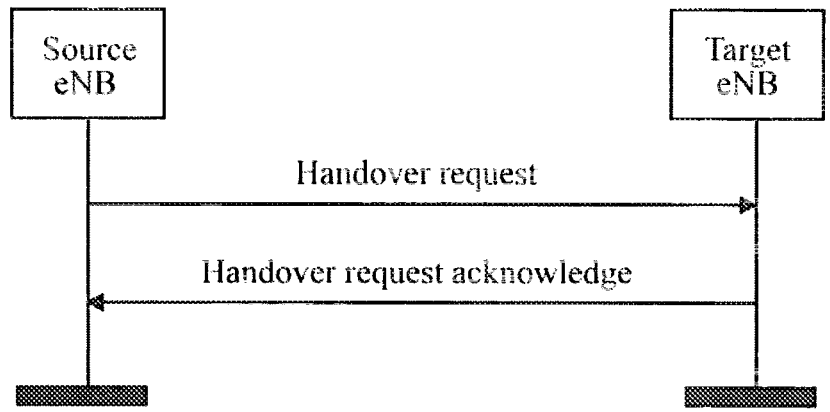
FIG. 3 is a schematic diagram of an X2 handover preparation procedure in the prior art.

Referring to FIG. 3B, an embodiment of the invention further provides a wireless communication system, which includes:

a source RN 72 configured to receive a cell measurement report reported from a UE, to determine a cell with an eNB identifier of the RN according to the received cell measurement report, to prepare RRC reestablishment information of the cell and to send a handover request message carrying the prepared RRC reestablishment information to a DeNB serving the RN; and the DeNB 73 configured to receive the handover request message, to parse handover preparation information in the handover request message to obtain RRC reestablishment information of one or more cells, to select RRC reestablishment information of a cell managed by the DeNB from the obtained RRC reestablishment information, and to store the selected RRC reestablishment information.

The DeNB is further configured:

to determine whether the obtained RRC reestablishment information of the one or more cells comprises RRC reestablishment information of a cell managed by an RN served by the DeNB after obtaining the RRC reestablishment information and to send the handover request message to the RN when the determination is positive.

The DeNB is further configured:

to store received uplink data and/or downlink data of a UE forwarded by the source RN.

Figure 8:
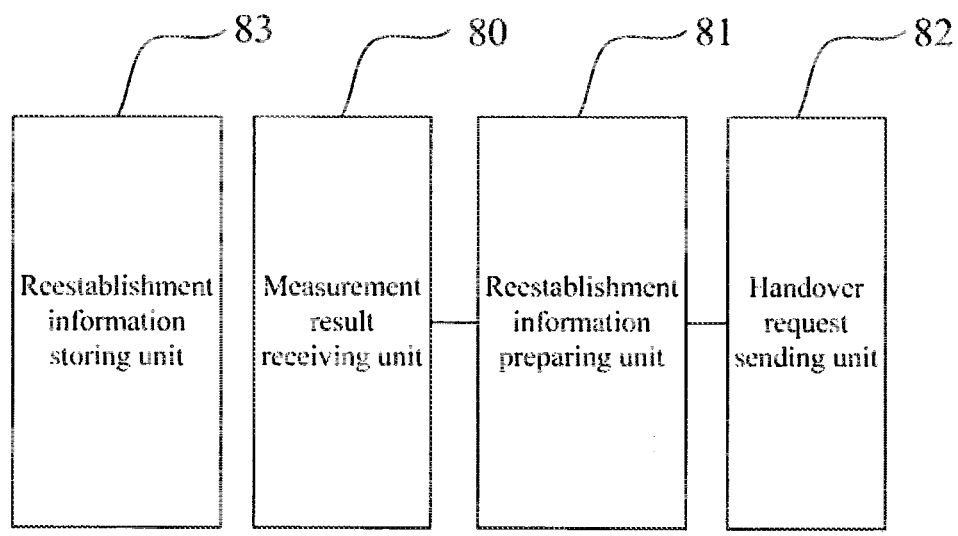
FIG. 8 is a schematic structural diagram of an apparatus according to an embodiment of the invention.

Referring to FIG. 8, an embodiment of the invention further provides an apparatus for sending RRC reestablishment information, which can be applied to the foregoing wireless communication system, and the apparatus includes:

a measurement result receiving unit 80 configured to receive a cell measurement report reported from a UE;

a reestablishment information preparing unit 81 configured to determine a cell with the same eNB identifier of the RN according to the received cell measurement report and to prepare RRC reestablishment information of the cell; and a handover request sending unit 82 configured to send a handover request message carrying the prepared RRC reestablishment information to a DeNB.

The reestablishment information preparing unit 81 is configured:

to determine whether first 20 bits of a cell identifier in the cell measurement report is the same as the eNB identifier of the RN and to determine a cell corresponding to the cell identifier as the cell with the same eNB identifier of the RN when the determination is positive.

The apparatus further includes:

a reestablishment information storing unit 83 configured to receive a handover request message carrying a target cell identifier and RRC reestablishment information, wherein the target cell identifier is an identifier of a cell which is not managed by the RN, and the RRC reestablishment information is RRC reestablishment information of a cell managed by the RN, to store the RRC reestablishment information and to return a handover request acknowledgment message to a node sending the handover request message.

The apparatus for sending RRC reestablishment information according to the embodiment of the invention can particularly be an RN.

Figure 9:
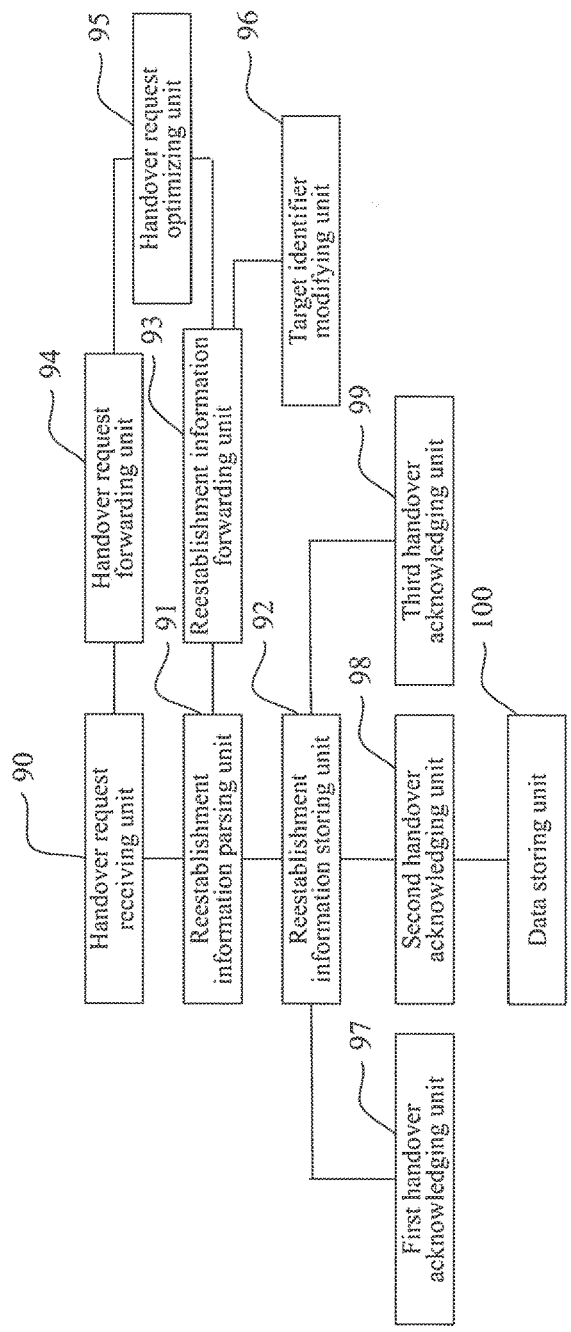
FIG. 9 is a schematic structural diagram of another apparatus according to an embodiment of the invention.

Referring to FIG. 9, an embodiment, of the invention further provides an apparatus for acquiring RRC reestablishment information, which can be applied to the foregoing wireless communication system, and the apparatus includes:

a handover request receiving unit 90 configured to receive a handover request message;

a reestablishment information parsing unit 91 configured to parse handover preparation information in the handover request message to obtain RRC reestablishment information of one or more cells; and a reestablishment information storing unit 92 configured to select RRC reestablishment information of a cell managed by a current DeNB from the obtained RRC reestablishment information and to store the selected RRC reestablishment information.

The apparatus further includes:

a reestablishment information forwarding unit 93 configured to determine whether the obtained RRC reestablishment information comprises RRC reestablishment information of a cell managed by an RN served by the DeNB and to send the handover request message to the RN when the determination is positive.

The apparatus further includes:

a handover request forwarding unit 94 configured to send the handover request message to a target node when the DeNB is not the target node, where the target node is a node managing the target cell indicated in the handover request message.

The apparatus further includes:

a handover request optimizing unit 95 configured to delete information of a cell unrelated to the node receiving the handover request message from the handover request message before the handover request message is sent, where the information of the cell includes RRC reestablishment information.

The apparatus further includes:

a target identifier modifying unit 96 configured to modify a target cell identifier carried in the handover request message to an identifier of a cell managed by the RN before the handover request message is sent.

The apparatus further includes:

a first handover acknowledging unit 97 configured to perform admission control according to the handover request message and to send a handover request acknowledgement message to a source node sending the handover request message when the DeNB is a target node and the target node is a node managing the target cell indicated in the handover request message.

The apparatus further includes:

a second handover acknowledging unit 98 configured, when the target node is an RN served by the DeNB, to forward to a source node sending the handover request message a handover request acknowledgement message sent from the target node after receiving the handover request acknowledgement message; or to select one handover request acknowledgement message from received handover request acknowledgement messages sent from all or a part of specific RNs after receiving the handover request acknowledgement messages and to forward the selected handover request acknowledgement message to a source node sending the handover request message, wherein the specific RNs are RNs to which the DeNB sends the handover request message; or to forward all the received handover request acknowledgement messages to a source node sending the handover request message.

The apparatus further includes;

a third handover acknowledging unit 99 configured, when the target node is another eNB, to forward to a source node sending the handover request message a handover request acknowledgement message sent from the target node after receiving the handover request acknowledgement message; or to select one handover request acknowledgement message from received handover request acknowledgement messages sent from the target node and all or a part of specific RNs after receiving the handover request acknowledgement messages and to forward the selected handover request acknowledgement message to a source node sending the handover request message, wherein the specific RNs are RNs to which the DeNB sends the handover request message; or to forward all the received handover request acknowledgement messages to a source node sending the handover request message.

The apparatus further includes:

a data storing unit 100 configured to store received uplink data and/or downlink data from a UE of a source node sending the handover request message.

The apparatus for acquiring RRC reestablishment information according to the embodiment of the invention can particularly be a DeNB.

In summary, the invention offer the following advantageous effects:

In the solutions according to the embodiments of the invention, an RN prepares RRC reestablishment information of a cell of a DeNB serving the RN and/or another RN managed by the DeNB in addition to RRC reestablishment information of a target cell when preparing RRC reestablishment information, and sends the prepared RRC reestablishment information to the DeNB over a handover request message. The DeNB need parse handover preparation information in the handover request message after receiving the handover request message and store the obtained RRC reestablishment information of the cell managed by the DeNB. Thus, if a UE performs RRC reestablishment to the cell managed by the DeNB upon handover failure, then the reestablishment success rate to the cell managed by the DeNB can be greatly increased, the handover failure rate can be decreased, the drop probability can be lowered and user experience can be improved because the DeNB stores the RRC reestablishment information of the cell managed by the DeNB.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

What is claimed is:

1. A method for sending Radio Resource Control, RRC, reestablishment information, comprising:
   receiving, by a Relay Node, RN, a cell measurement report reported from a User Equipment, UE;
   determining, by the RN, a cell with the same eNB identifier of the RN according to the received cell measurement report and preparing RRC reestablishment information of the cell; and
   sending, by the RN, a handover request message carrying the prepared RRC reestablishment information to a Donor eNB, DeNB, serving the RN,
   wherein determining, by the RN, the cell with the eNB identifier of the RN according to the received cell measurement report comprises:
      determining, by the RN, whether first 20 bits of a cell identifier in the cell measurement report is the same as the eNB identifier of the RN, and
      determining a cell corresponding to the cell identifier as the cell with the same eNB identifier of the RN when the determination is positive.

2. The method according to claim 1, further comprising:
   receiving, by the RN, a handover request message carrying a target cell identifier and RRC reestablishment information, wherein the target cell identifier is an identifier of a cell which is not managed by the RN, and the RRC reestablishment information is RRC reestablishment information of a cell managed by the RN; and
   determining, by the RN, a non-abnormal condition, storing the RRC reestablishment information and returning a handover request acknowledgment message to a node sending the handover request message.

\* \* \* \* \*